Aug. 6, 1935.  E. E. COOPER  2,010,535
SEAL CAP FOR CLOSURES
Filed July 6, 1933
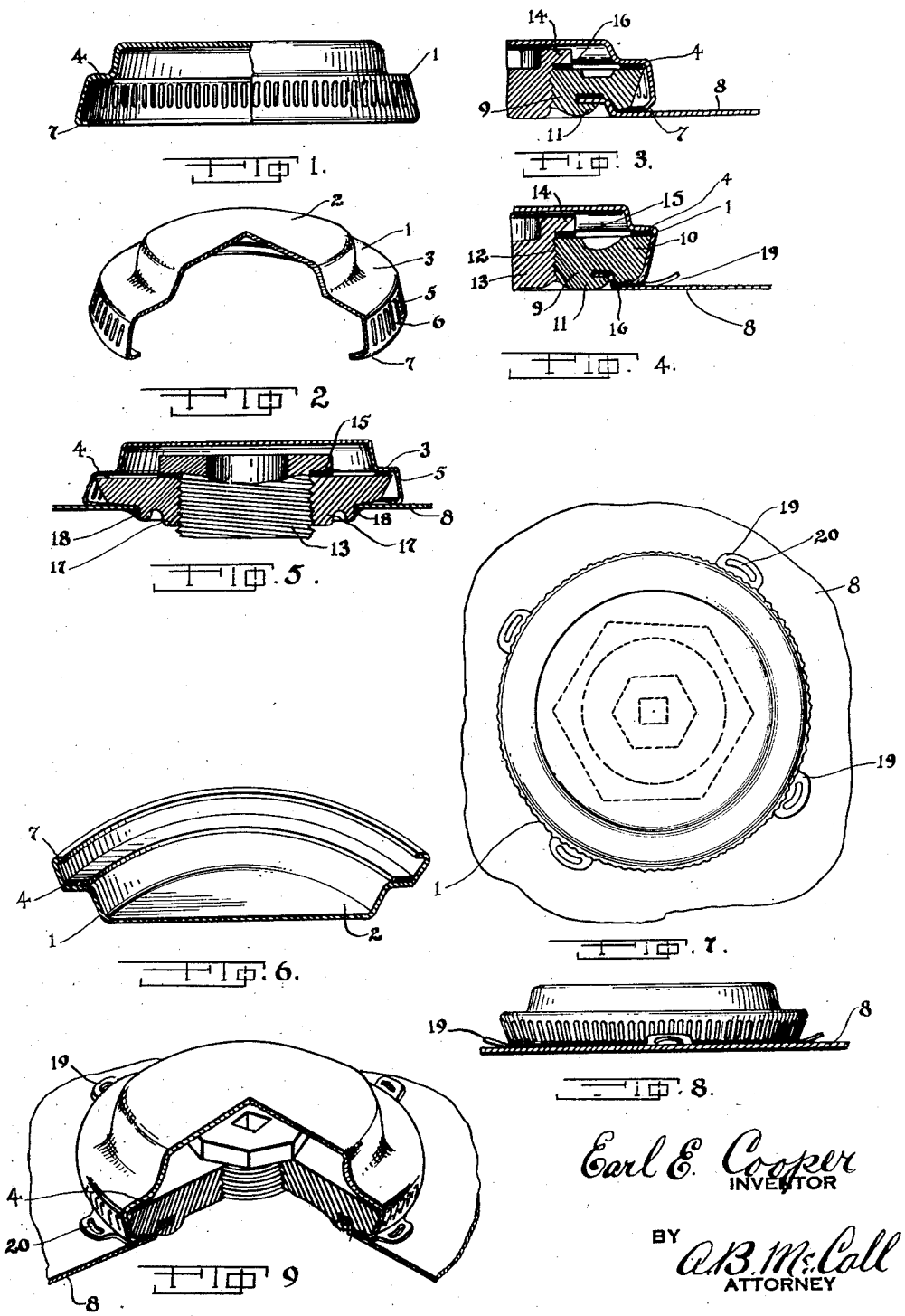
Earl E. Cooper
INVENTOR
BY A.B. McCall
ATTORNEY Patented Aug. 6, 1935

2,010,535

UNITED STATES PATENT OFFICE 2,010,535

SEAL CAP FOR CLOSURES

Earl E. Cooper, Decatur, Ill., assignor to Chambers, Bering, Quinlan Company, Decatur, Ill., a corporation Application July 6, 1933, Serial No. 679,225

2 Claims. (Cl. 220—39)

This invention relates to closures for containers, and more especially to closures for oil barrels and other metallic containers for fluids; an object in my device being to provide a simple, practical, and inexpensive device for the protection of closure bushings and closure plugs when in use in connection with such containers, wherein the protection is needed to prevent tampering with the container closure fastenings.

A purpose of my invention is to provide as a new article of manufacture a combination leak proof and tamper proof seal cap for closures, manipulative members, locks, and protection devices.

A further purpose of my invention is to provide a method of applying a seal cap to closures, manipulative members, locks, and protection devices.

A particular object of my invention is to provide a combination leak proof and tamper proof seal cap for container closures and to provide the same in combination with closure members adapted to be protected thereby; and more specifically, in this instance, to provide a seal cap designed in a manner permitting its free edge, which is turned in all around, defining its bottom flange, to be constricted or crimped inwardly around the periphery of a closure bushing so that the flange thus constricted will fit tightly in under the outer portion of the bushing occupying the relatively thin space between the container sheet and the outer undercut portion of the bushing.

With my invention I propose to prevent undetected removal of the seal cap and its replacement since the invention when in use makes it virtually impossible to remove the seal cap with tools without destroying its utility as a seal cap. The result is that where the cap has been tampered with and removed, this fact will become evident; since any attempted tampering with the constricted seal cap about its corrugated periphery will be ineffectual on the turned-in constricted edge without spoiling the seal cap.

One of my intended adaptations of this invention is in connection with its use as a seal cap for oil barrels and other fluid containers wherein I use a bushing in the container wall with a threaded hole therein and a threaded plug secured in the hole with the bushing undercut about its perimeter and the seal cap completely covering the plug and encompassing the bushing in a tightly clamped position. The bushing is beaded to the container wall as portions of it extend through a hole therein with a non-circular boss in the wall about the hole deformed to prevent turning of the bushing in the container wall; while a leak proof gasket is used for the plug and seal cap to prevent leakage of fluids from the container through the closure structure.

In a study of the drawing it will become evident that my invention will have merit in connection with other adaptations than those illustrated.

This application is filed as a continuation in part of application Serial No. 607,965, filed April 28, 1932.

I attain the objects of my invention by the device described in the annexed specification, recited in the claims and illustrated in the accompanying drawing, in which like reference numerals indicate like parts in the several figures.

Figure 1 is a vertical view of my seal cap per se with a quarter section of the cap disclosing details of its construction.

Figure 2 is a perspective of the device shown in Fig. 1.

Figure 3 is an enlarged sectional detail of my seal cap in its combination with a closure bushing and plug on a container wall.

Figure 4 is a sectional detail of the structure shown in Fig. 3 by showing the seal cap constricted to its sealed position about the periphery of the closure bushing.

Figure 5 is a vertical half-section of my invention adapted to the structure of a more simple type of bushing than the one shown in Figs. 3 and 4.

Figure 6 is a perspective of my seal cap in an inverted position and disclosing a gasket therein.

Figure 7 is a top view of my seal cap in a crimped or constricted position.

Figure 8 is a side view of the closure structure shown in its sealed position.

Figure 9 is a perspective of the crimped or constricted seal cap showing in a quarter section the fitting relation of the cap to the other closure members.

My seal cap for closures in its adaptations is not confined to the type of closures illustrated in the drawing; but for the sake of explanation of the merits of my seal cap and its organization with closure members with which it may operate I have disclosed structure that is practical and effective for the purposes of my invention wherein a seal cap body 1 comprises in integral combination a crown 2 for covering a closure plug, an intermediate portion 3 which may be flat if desired for engaging a fluid proof gasket 4; while the outer periphery 5 of the seal cap is preferably crimped into corrugations 6 with an edge 7 turned inwardly all around for the purpose of providing a more substantial clinching or sealing operation for the protection of container closures.

For the sake of explanation let us consider, with reference to the drawing, the adaptation of my seal cap to a closure for fluid containers wherein a sheet metal container wall 8 is provided with a hole through which a central portion 9 of a bushing 10 extends and to which the bushing is clamped by a beading ring or collar 11.

This particular bushing is the subject matter for a patent which I have already secured. Detailed description is not essential in this application beyond an explanation of such a bushing in its functions in connection with which my seal cap serves as a protection for it.

A threaded central hole 12 in bushing 10 receives a closure plug 13, the head 14 of which is screwed down upon gasket 15 so that when gasket 4 and gasket 15 are both used then the container will be more nearly leak proof when it is considered that a third gasket 16 is used in connection with the attachment of bushing 10 to the container wall 8.

It will be observed that my seal cap, before it is put on, has a form such as is illustrated in Figures 1 and 2 and after it is constricted into position either by automatic tools or by hand operated clamping tools it takes the appearance illustrated in Figs. 4, 8, and 9 wherein the turned in free edge of the crimped and constricted perimeter of seal cap 1 is shown to be forced back in under the periphery of the lower side of bushing 10; thus to increase the protection against tampering with seal cap 1 with tools which would be able to effect a removal of the seal cap and a replacement thereof if desired without detection were it not for the flanged edge 7 being turned in under the undercut portion of bushing 10 where tampering tools may not gain easy access to it.

It will be noted in Figure 5 that I am illustrating a bushing 17 adapted to be welded along welding line 18 to a sheet metal container wall 8 merely to show that my sealing cap will operate successfully with other types of bushings than my patented bushing illustrated, for instance, in Figures 3, 4, and 9 and in these figures it is shown how the seal cap amply covers and protects both the bushing and the plug 13 threadable therein.

It will be noted in Figure 7, that eyelets 19 having slots or orifices 20 are secured by an integral ring to container wall 8 as means of attachment for wires (not shown) clamped on in place across the top of seal cap 1 to further help protect the cap from unwarranted removal.

I have disclosed a method and means of successfully applying and using a seal cap which is economical and practical to manufacture and which is now proving its efficiency in its various adaptations as evidenced by a wide spread and growing public acceptance.

This wire feature is admittedly not new and incidentally is merely used as special protection.

It will be seen that I therefore provide a seal cap for closures which is essentially practical and economical while at the same time it provides an additional leak proof protection in the event of a leakage developing in the closure plug gasket. This provides the protection which renders fluid container barrels proof against unauthorized openings and provides for the necessity of spoiling the seal cap for further use when it has once been opened.

It will be further observed that my invention is designed so that a closure plug of any suitable height may be used and yet be protected within the scope of my invention.

Thus my new improved invention makes it possible for an original filler of a fluid tank or barrel to apply my sealing cap to the closure members and effectively prevent unauthorized openings thereof without such opening being detected.

Having thus described the nature of my invention, what I claim is:

1. A tamper-proof seal for container closures comprising in combination a closure bushing engaging a container wall and having a central opening and an inwardly sloping perimeter the bottom shoulder of which is shaped to define an under-cut portion making a small space between the bushing and the container wall, a sealing cap having an inwardly directed flange for its perimeter, said flange being forced with its inwardly directed terminal edge into the space between the bushing and the container wall, thus to prevent access to the inwardly directed flange terminal edge on the sealing cap without destroying said cap.

2. A tamper-proof seal for container closures comprising in combination a container sheet having an opening, a bushing seated in the opening and secured to said sheet and having a central threaded hole for a threaded plug, and provided with an inwardly sloping perimeter face, a fluid-proof gasket held between the bushing and sheet by the means of engagement between the bushing and sheet; said perimeter of the bushing shaped about the bottom edge thereof to define a relatively small space between the bushing and the container wall, and a sealing cap of pliable sheet material shaped to cover said bushing and plug and provided with a deformed perimeter defining a flange whose terminal edge is inwardly directed; said inwardly directed flange of the cap being forced into said space between the bushing and the container sheet by mechanical constriction while the cap is firmly held in place so as to caulk and fill said space and totally enclose the bushing thereby to prevent access to the inwardly directed cap flange without destroying said cap.

EARL E. COOPER.